(12) United States Patent (10) Patent No.: US 7,161,620 B2
Watanabe et al. (45) Date of Patent: Jan. 9, 2007

(54) MOVING PEDESTAL FOR A CAMERA INCLUDING WHEELS AND SENSORS FOR DETECTING A MOVING AMOUNT THEREOF

(75) Inventors: Keijiro Watanabe, Kawasaki (JP); Iwao Fujita, Kawasaki (JP); Naoki Ebimoto, Kawasaki (JP); Kohsei Tanaka, Tokyo (JP); Tadao Matsuno, Tokyo (JP)

(73) Assignees: Shotoku Ltd., Kawasaki-shi (JP); Tokyo Broadcasting System, Inc., Tokyo (JP)

( * ) Notice: Subject to any disclaimer, the term of this patent is extended or adjusted under 35 U.S.C. 154(b) by 639 days.

(21) Appl. No.: 10/007,175

(22) Filed: Oct. 23, 2001

(65) Prior Publication Data

US 2002/0164164 A1 Nov. 7, 2002

(30) Foreign Application Priority Data

Oct. 25, 2000 (JP) ............................. 2000-325785

(51) Int. Cl.
*H04N 5/225* (2006.01)
*H04N 5/222* (2006.01)
*G03B 17/00* (2006.01)
*G03B 19/18* (2006.01)

(52) U.S. Cl. ................. 348/207.99; 348/722; 348/373; 396/419; 352/53

(58) Field of Classification Search ................. 280/62; 396/419, 428, 429; 352/243, 131, 132, 53, 352/197; 348/207.99, 207.1, 273, 143, 722, 348/373

See application file for complete search history.

(56) References Cited

U.S. PATENT DOCUMENTS 4,092,673 A * 5/1978 Adams .................... 348/211.3

(Continued)

FOREIGN PATENT DOCUMENTS

EP 0 971 319 A2 1/2000

(Continued)

OTHER PUBLICATIONS

Virtual Studio Camera Position Measurement System; 2 pages, RADAMEC Broadcast Systems; Surrey, England.

(Continued)

*Primary Examiner*—Vivek Srivastava
*Assistant Examiner*—Justin Misleh
(74) *Attorney, Agent, or Firm*—Frishauf, Holtz, Goodman & Chick, P.C.

(57) ABSTRACT

A method is provided for picking up an image of an object with a camera mounted via a pan head on a moving pedestal. A reference position on a floor surface on which the moving pedestal moves and a reference angle of the moving pedestal are both set. A moving amount of the moving pedestal from the reference position and a rotation angle thereof from the reference angle are detected, and a position and an angle of the camera with respect to the object is found on the basis of the reference position, the reference angle, the moving amount and the rotation angle of the moving pedestal. Data of the position and the angle of the camera with respect to the object are transmitted to a computer for creating an image containing a real object image of the object taken with the camera.

7 Claims, 8 Drawing Sheets

U.S. PATENT DOCUMENTS

| | | | |
|---|---|---|---|
| 5,008,804 A | | 4/1991 | Gordon et al. |
| 5,153,833 A | * | 10/1992 | Gordon et al. ................ 701/26 |
| 5,457,370 A | * | 10/1995 | Edwards ..................... 318/571 |
| 5,471,385 A | * | 11/1995 | Suzuki et al. ................. 701/23 |
| 5,479,597 A | * | 12/1995 | Fellous .................... 715/500.1 |
| 5,729,108 A | * | 3/1998 | Steele ....................... 318/575 |
| 5,930,740 A | * | 7/1999 | Mathisen .................... 702/152 |
| 5,949,433 A | * | 9/1999 | Klotz ........................ 345/634 |
| 6,088,527 A | * | 7/2000 | Rybczynski .................... 396/1 |
| 6,201,579 B1 | * | 3/2001 | Tamir et al. ................ 348/579 |
| 6,520,641 B1 | * | 2/2003 | Walton et al. .............. 352/243 |

FOREIGN PATENT DOCUMENTS

| | | | |
|---|---|---|---|
| GB | 2 259 823 A | 3/1993 | |

OTHER PUBLICATIONS

Thoma; Product Information About The Camera Support in Virtual Studios; IBC' 1998; 2 sheets, Thoma-Filmtechnik, Sauerlach, Germany.

Infrared Walkfinder; Intelligent Infrared Precision Cameras; 6 sheets, Thoma-Filmtechnik; Sauerlach, Germany.

Cyberset O; High-end Virtual Set; 6 sheets; Orad Hi-Tec Systems; Kfar Saba Isreal.

Thoma; Super Panther III—Dolly; 2 sheets; Nov. 1997; Thoma-Filmtechnik; Sauerlach, Germany.

* cited by examiner

MOVING PEDESTAL FOR A CAMERA INCLUDING WHEELS AND SENSORS FOR DETECTING A MOVING AMOUNT THEREOF

BACKGROUND OF THE INVENTION

1. Field of the Invention

The present invention relates to an image pick-up method and an image pick-up system of a mobile-type camera system used for location of movies and television programs, and more specifically to an image pick-up method and an image pick-up system of a mobile-type camera system suitable for shooting in virtual studios.

2. Description of the Related Art

When shooting in a studio, a mobile-type camera system is used and it has a structure in which a pan head is set on a mobile base called pedestal, and a camera is placed on the pan head. Then, a cameraman shoots a scene while moving the pedestal so as to change the camera angle appropriately.

In a virtual studio, for example, there is a case where a real object image taken with the camera system in the studio and computer graphics (CG) created as its background or effect, are operated together in relation with each other while maintaining the three-dimensional relationship in position as viewed from the camera position. In such a case, techniques of analyzing the two-dimensional position of the pedestal in the virtual space, as well as the position and angle of the camera set on the pedestal, are employed. That is, according to these techniques, when the two-dimensional position of the pedestal and the position and angle of the camera are determined, the relationship among the positions of the pedestal, camera, an object and CG can be found out by calculation. In this manner, the object taken by the camera and the CG image can be combined and moved together in relation with each other while maintaining the three-dimensional relationship between the positions of the object and the CG image.

The following are some of the examples of the conventional techniques proposed in consideration of the above.

(1) The method of recognizing the two-dimensional position of a pedestal, wherein a great number of position marks are made on the ceiling of the studio, and as the sensor provided on the pedestal reads some of the marks, the read marks are image-processed, thereby to recognize the position of the pedestal.

(2) The method of detecting the position of a pedestal, wherein a marker is set on the pedestal and the marker is read by a plurality of detection cameras provided in the studio, thereby to detect the position of the pedestal.

(3) The method of recognizing the pedestal, wherein a mark such as a bar code, which is included in the blue-back image taken with the studio camera as the background, is read by a detector, and the view corresponding the mark is image-processed, thereby to recognize the position of the pedestal.

(4) The method of detecting the position of a pedestal, wherein rails are laid in the studio and the pedestal are run on them while detecting the distance of the movement.

However, the above-described methods entail the following drawbacks, respectively.

First, as to the method (b 1), in some cases, position marks cannot be read from the position of the pedestal. More specifically, there are, usually, a great number of lighting tools which are suspended from the ceiling of a studio, and some of them physically block the view. Further, the reading of a position mark may be disturbed by illumination light.

As to the method (2), as the detectable area is widened, a greater number of detection cameras are required, thus increasing the cost.

As to the method (3), a mark included in the background image must be always located within the view of the camera, and therefore the movable range of the camera is limited. Further, when the size of the object increases in the image, such as in zoom-in for close-ups, etc., the ratio of the mark included in the background image may be excessively decreased as compared to the whole scene, thus making it impossible to detect it in the image.

As to the method (4), the movement of the camera is limited by the tracks of the rails, and therefore the applicability is low.

With any of the above-described methods, it is difficult to detect the positional relationship between the camera and the object to be shot at a high accuracy.

BRIEF SUMMARY OF THE INVENTION

The object of the present invention is to provide an image pick-up method and an image pick-up system which can find the relationship in position between the camera and an object at a high accuracy, inexpensively and without causing limitation to shooting.

According to an aspect of the present invention, there is provided an image pick-up method for picking up an image of an object with a camera mounted via a pan head on a moving pedestal, comprising the steps of: setting a reference position on a floor surface on which the moving pedestal moves, and a reference angle of the moving pedestal; detecting a moving amount of the moving pedestal from said reference position and a rotation angle thereof from said reference angle; finding a position and an angle of the camera with respect to the object on the basis of said reference position, said reference angle, said moving amount and said rotation angle of the moving pedestal; and transmitting data of the position and the angle of the camera with respect to the object, to a computer for creating an image containing a real object image of the object taken with the camera.

According another aspect of the present invention, there is provided an image pick-up system for picking up an image of an object, comprising: a camera unit having a structure in which a camera for picking up an image of an object, is mounted via a pan head on a moving pedestal; an operation means for calculating a positional relationship between the camera and the object; a setting means for setting a reference position on a floor surface on which the moving pedestal moves, and a reference angle of the moving pedestal to said operation means; and a detection means for detecting a moving amount of the moving pedestal from the reference position, and a rotation angle thereof from the reference angle, wherein said operation means calculates out a position and an angle of the camera with respect to the object on the basis of the reference position, the reference angle, the moving amount and the rotation angle of the moving pedestal, and transmits data of the position and the angle of the camera with respect to the object, to a computer for creating an image containing a real object image of the object taken with the camera.

According still another aspect of the present invention, there is provided an image pick-up system for picking up an image of an object, comprising: a moving pedestal including three wheels; a camera unit having a structure in which a camera for picking up an image of an object, is mounted via a pan head on said moving pedestal; an operation means for calculating a positional relationship between the camera and the object; three encoders provided respectively for the three wheels of said moving pedestal; a plurality of sensors provided on said moving pedestal, for detecting a predetermined mark made on a floor surface on which said moving pedestal moves; and a setting means for setting a reference position on the floor surface, and a reference angle of said moving pedestal, which are found from detection values of said plurality of sensors and a pulse numbers counted by said encoders in the movement of said moving pedestal, to said operation means, wherein said operation means calculates out a position and an angle of the camera with respect to the object on the basis of the reference position, the reference angle, the moving amount and the rotation angle of said moving pedestal, which are obtained from the pulse numbers counted by said encoders, and transmits data of the position and the angle of the camera with respect to the object, to a computer for creating an image containing a real object image of the object taken with the camera.

According to the present invention, the reference position is set on the floor surface on which the moving pedestal is moved around, and the moving amount of the pedestal from the reference position and the rotation angle from the reference angle are detected. Thus, from the reference position, the reference angle, the moving amount of the moving pedestal and the rotation angle thereof, the position and angle of the camera with respect to the object can be found. In this manner, the positional relationship between the camera and the object can be found without especially providing costly facilities or without limiting the shooting operation. In addition to that, the moving pedestal can be moved around at random, and therefore present invention has a high applicability. Further, an error created due to the change in the tire diameter of the moving pedestal, or the change in the angle of the moving pedestal can be suppressed to a very low level, and therefore the position and the angle of the moving pedestal can be accurately found. As a result, an image containing the real object image shot with the camera can be created at a high accuracy.

In the present invention, it is desirable to obtain the moving amount of the moving pedestal by measuring a length of a portion of the wheel of the moving pedestal, which has been brought into contact with the floor surface. As a result, the moving distance of the moving pedestal can be accurately found.

The rotation angle of the moving pedestal can be calculated from the moving distances of two of at least three wheels of the pedestal, which are distant with respect to the moving direction. In this manner, the angle of the moving pedestal can be accurately found. Further, the two wheels can be selected which are most distant. In this manner, the angle of the moving pedestal can be more accurately found.

Further, in the present invention, the first and second lines are formed on the floor surface so that they normally cross with each other from the reference position, and two of the first sensors for detecting the first line and one second sensor for detecting the second line are provided on the moving pedestal, and the reference position and the reference angle can be found on the basis of the moving amount at a time when the two first sensors each pass the first line, and the moving amount at a time when the second sensor passes the second line. In this manner, the reference position and reference angle of the moving pedestal can be easily found.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detail description of the preferred embodiments given below, serve to explain the principles of the invention.

DETAILED DESCRIPTION OF THE INVENTION

The present invention will now be described with reference to accompanying drawings.

Figure 1:
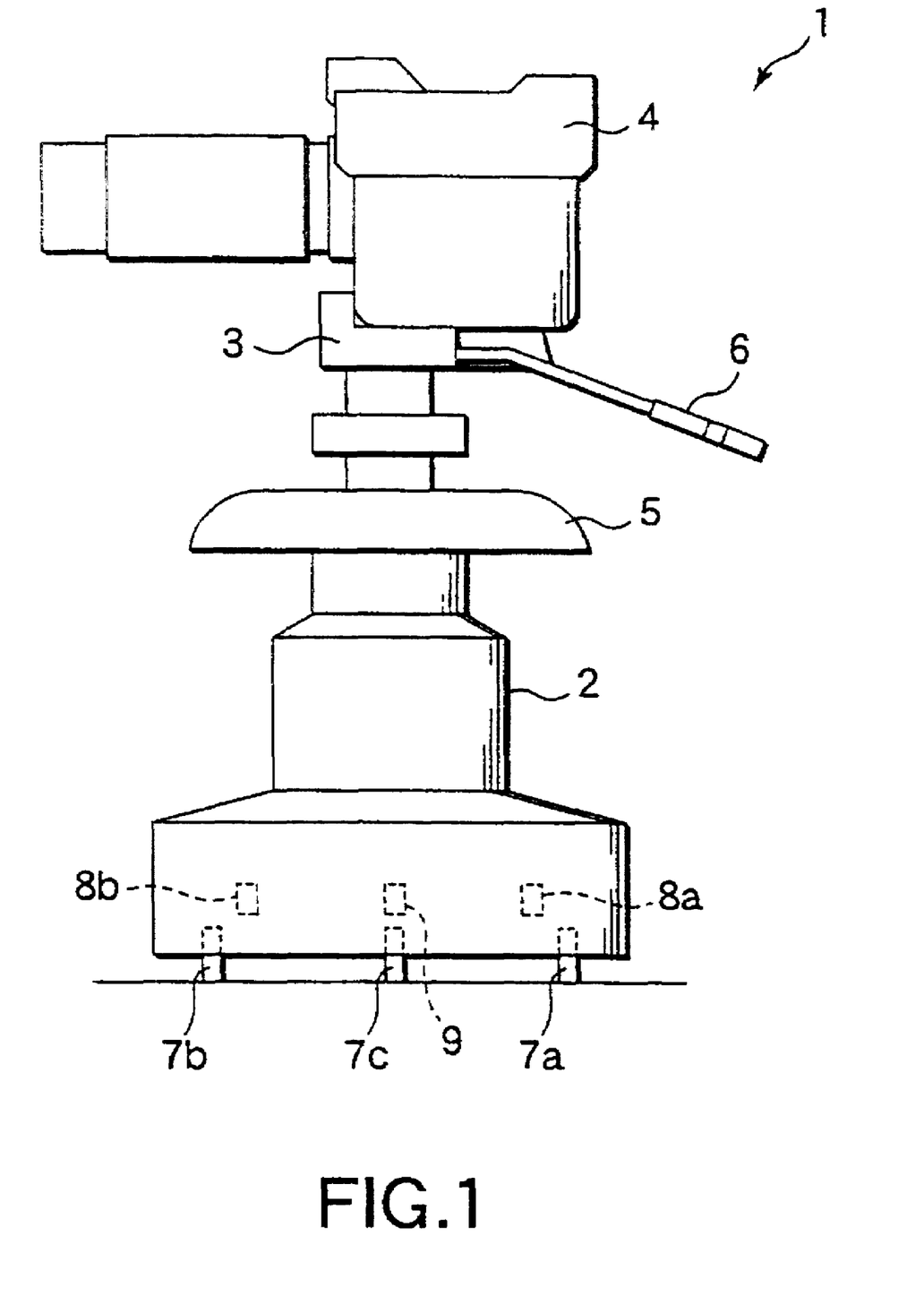
FIG. 1 is a side view of a TV camera unit used in the image pick-up method according to the present invention.
Figure 2:
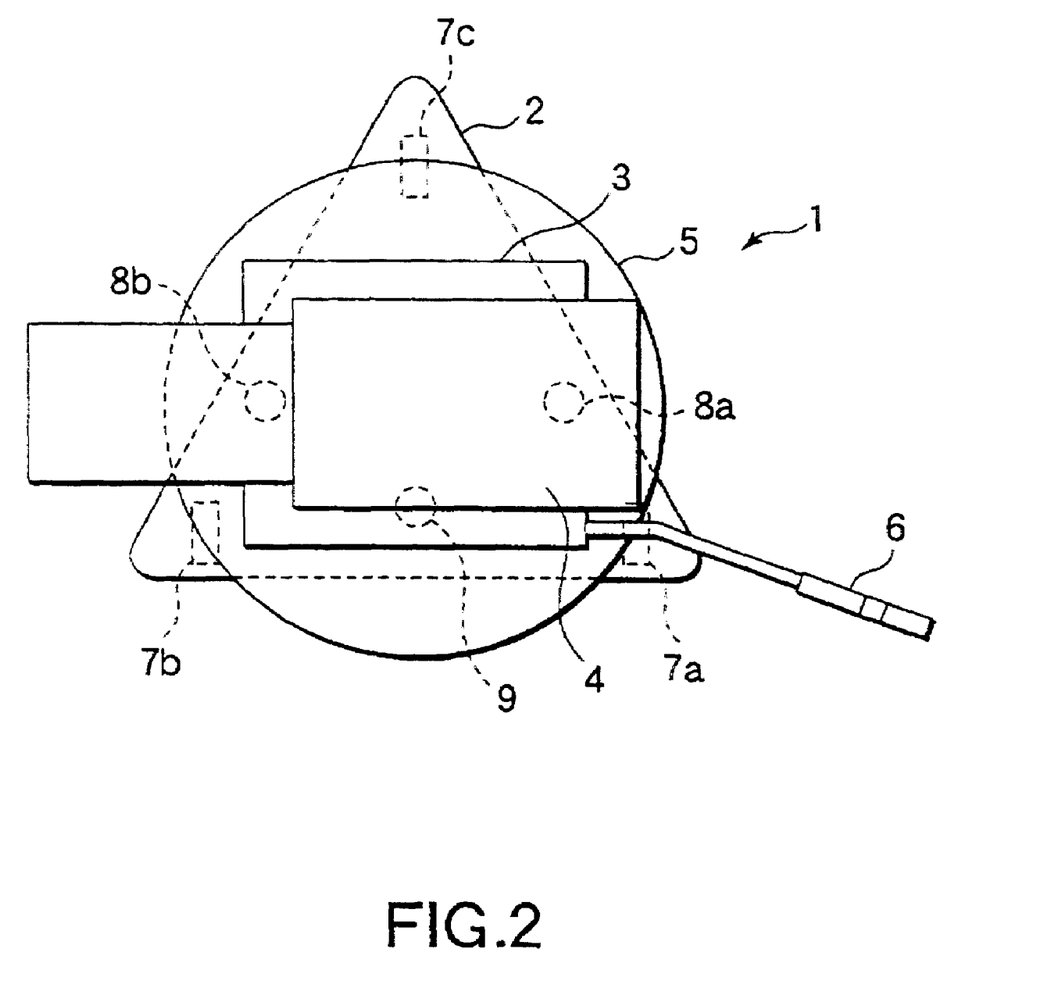
FIG. 2 is a plan view of the TV camera unit used in the image pick-up method according to the present invention.

FIG. 1 is a side view of a TV camera unit used in the image pick-up method according to the present invention, and FIG. 2 is a plan view thereof. A TV camera unit 1 includes a pedestal 2 serving as a moving base which runs on the floor surface of a studio, a pan head 3 set thereon, and a TV camera 4 mounted on the pan head 3, and the TV camera 4 can be rotated and tilted by means of the pan head 3. Also shown are a handle 5 used for changing the moving direction of the pedestal, and a lever 6 used for tilting or rotating the TV camera 4.

The pedestal 2 has a bottom portion provided with three running wheels 7a, 7b and 7c. Further, the bottom portion of the pedestal 2 has two of first optical sensors 8a and 8b, and one second optical sensor 9, which are used to set or correct the reference position and reference angle of the pedestal 2.

Next, the image pick-up system according to an embodiment of the present invention, in which the above-described camera unit 1 is used, and the image pick-up method using such a system will now be described with reference to the block diagram shown in FIG. 3 and the flowchart provided in FIG. 4.

Figure 3:
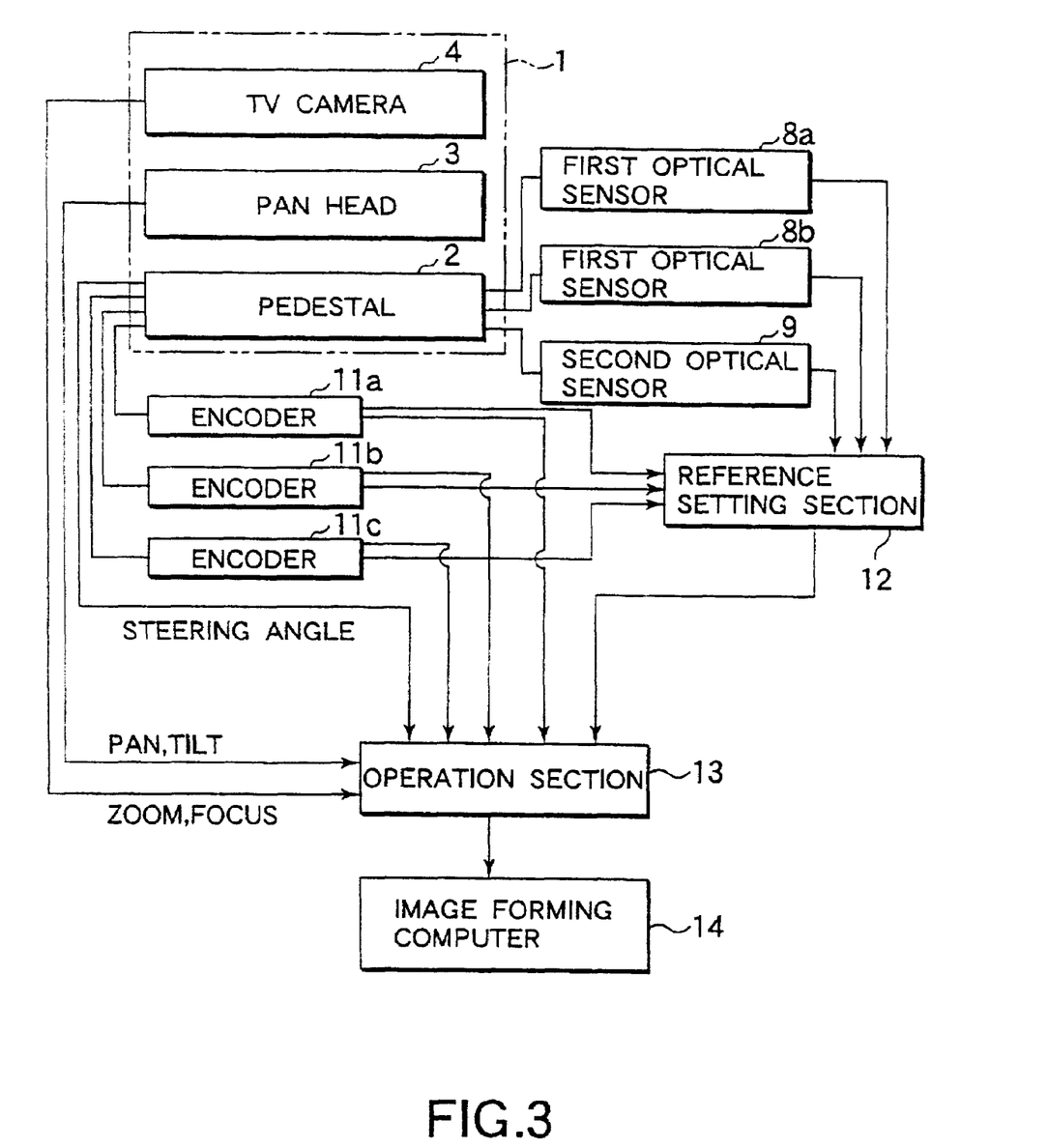
FIG. 3 is a block diagram showing an image pick-up system according to an embodiment of the present invention.

As shown in the FIG. 3, encoders 11a, 11b and 11c for detecting the running distance (movement amount) are connected to the rotation shafts of the wheels 7a, 7b and 7c of the pedestal 2. These encoders 11a, 11b, 11c, the first optical sensors 8a and 8b and the second optical sensor 9 are connected to a reference setting section 12. On the basis of data sent from the encoders 11a, 11b, 11c, the first optical sensors 8a and 8b and the second optical sensor 9, the reference position on the floor surface on which the pedestal 2 travels as well as the reference angle of the pedestal 2 are obtained by the reference setting section 12 as will be described later, and these data are set to an arithmetic operation section 13 (STEP 1 in FIG. 4). Further, other data such the steering angle of the pedestal 2, the panning and tilting of the pan head 3, the zooming and focusing of the TV camera 4 are also inputted to the arithmetic operation section 13.

Figure 4:
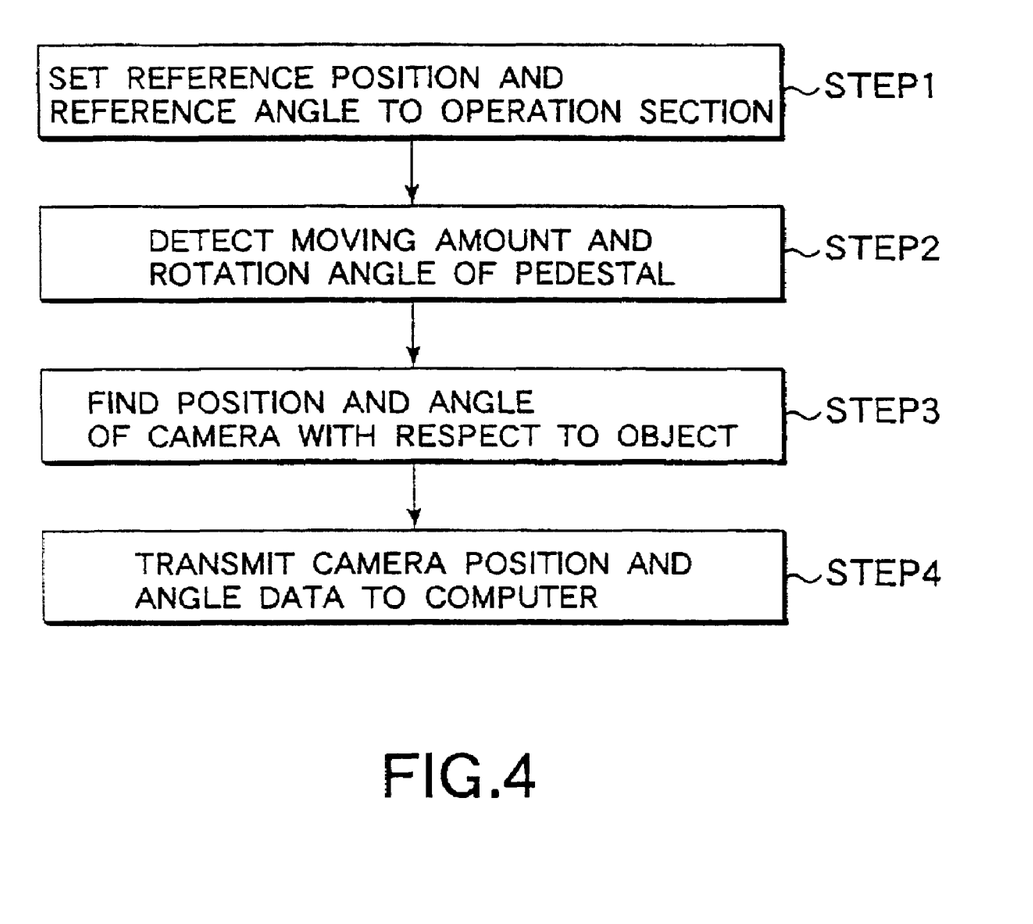
FIG. 4 is a flowchart illustrating the image-pick up method of the present invention.

As the pedestal 2 runs on the floor surface, the running distance (movement amount) of the wheels 7a, 7b and 7c are detected by the encoders 11a, 11b and 11c, and then, based on these detected values, the movement amount of the pedestal 2 from the reference position and the rotation angle from the reference angle are calculated by the operation section 13 (STEP 2 in FIG. 4).

After that, from the data of the reference position and reference angle sent from the reference setting section 12, the movement amount of the pedestal 2 and the data of the rotation angle obtained from the reference angle, the position and angle of the TV camera 4 with respect to the object are calculated by the operation section 13 (STEP 3 in FIG. 4).

Figure 5:
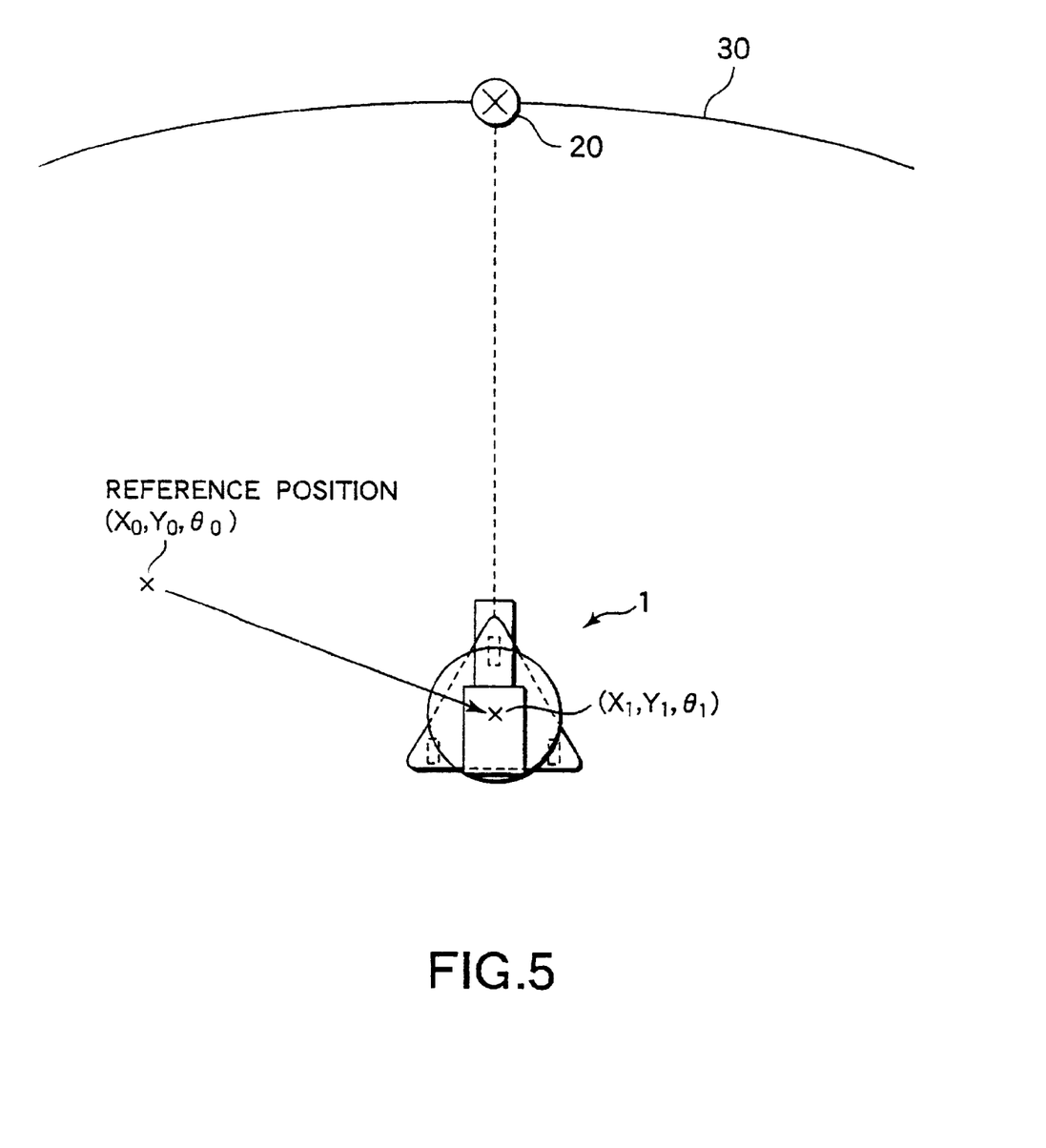
FIG. 5 is a schematic diagram illustrating how a real object image taken with the TV camera and a virtual image projected on a virtual screen in its background are operated in relation with each other, using the method of the present invention.

The data of the position and angle of the TV camera 4 with respect to the object, which are calculated by the operation section 13, are sent to an image forming computer 14 (STEP 4 in FIG. 4). The image forming computer 14 is able to operate a real object image (shot point 20) taken with the TV camera 4 and a virtual image projected on a virtual screen 30 in background of the real object, in relation with each other, as shown in FIG 5.

The moving amount of the pedestal 2 is measured with use of the encoders 11a, 11b and 11c mounted on the rotation shafts of the wheels 7a, 7b and 7c, respectively, as described above. The measurement of the moving amount with use of encodes is carried out in the following manner. That is, generally, the moving amount is calculated by dividing the diameter of the wheel with the number of pulse per one rotation detected by the encoder. However, the wheels (usually three of them) of the cart of the pedestal 2 are usually made of rubber, and therefore the contact state between the wheels and the floor surface varies from a case of running straight to a case of making a turn, thereby changing the diameter of the tire at the contact portion. Therefore, if the moving amount is measured directly from the rotation of the shaft and the diameter of the wheels, an error results and the measurement is not accurate.

Figure 6:
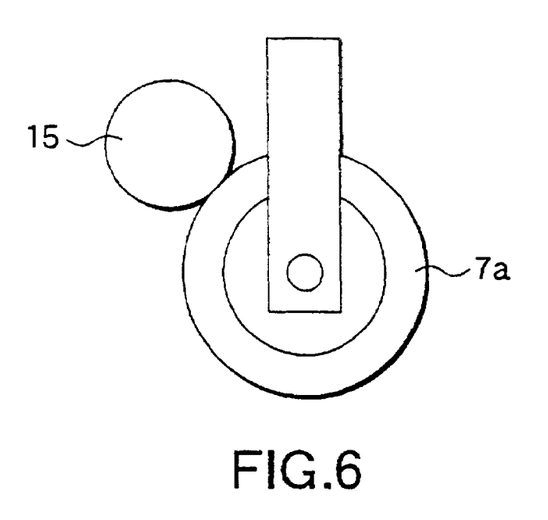
FIG. 6 is a diagram illustrating how to obtain the moving distance of a wheel in the embodiment.

In order to avoid such a drawback, as shown in FIG. 6, this embodiment provides a roller 15 whose diameter is known to each wheel (wheel 7a in FIG. 6). In this case, the roller 15 rotates along with the rotation of the wheel, and therefore when the rotation number of the roller 15 is known, the length of a portion of the wheel which is brought into contact with the floor, can be accurately detected regardless of the state of the wheel. More specifically, when the diameter of the roller 15 is divided by the pulse number per one rotation, the moving amount of the roller 15 is calculated. Here, even if the wheel is worn out, as long as the roller 15 is in contact with the wheel, the moving amount of the wheel can be accurately obtained from this calculated value of the roller.

Next, the method of setting data to the arithmetic operation section 13 by first recognizing the reference position on the floor surface on which the pedestal 2 moves around, and the reference angle of the pedestal 2, will now be described.

Figure 7A:
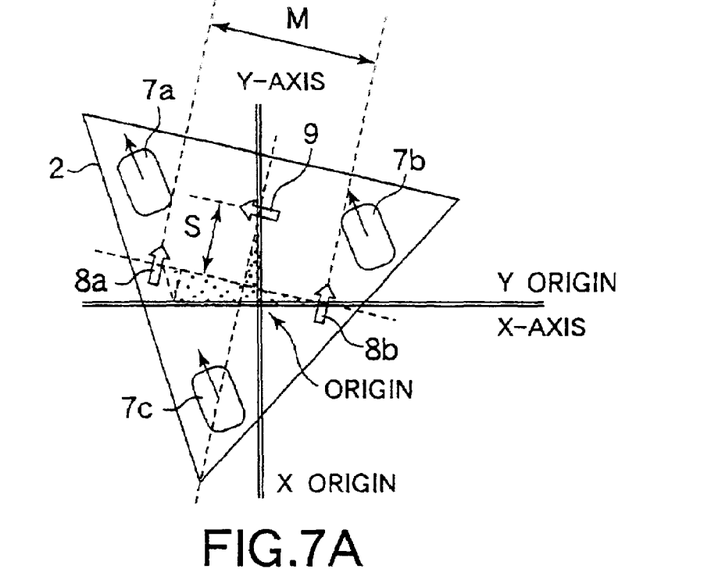
FIG. 7A is a diagram illustrating a method of recognizing and setting a reference position on the surface of a floor on which the pedestal is run, and a reference angle of the pedestal.

As shown in FIG. 7A, an X-axis and a Y-axis are formed with an origin corresponding to the reference position on the floor, and the pedestal 2 is moved around. Then, the difference in count between the encoders 11a and 11b of the wheels 7a and 7b at an instantaneous moment when the first optical sensors 8a and 8b pass the X-axis, which is the Y origin, is calculated. Based on thus calculated difference, the angle of the pedestal 2 is corrected, and the Y origin is calculated. Subsequently, on the basis of the position at an instantaneous moment when the second optical sensor 9 passes the X origin, the position of the X origin is calculated out from the current angle correction value. It should be noted that in this figure, the first optical sensors 8a and 8b, and the second optical sensor 9 are indicated in the form of arrows directed towards the line to be detected.

Figure 7B:
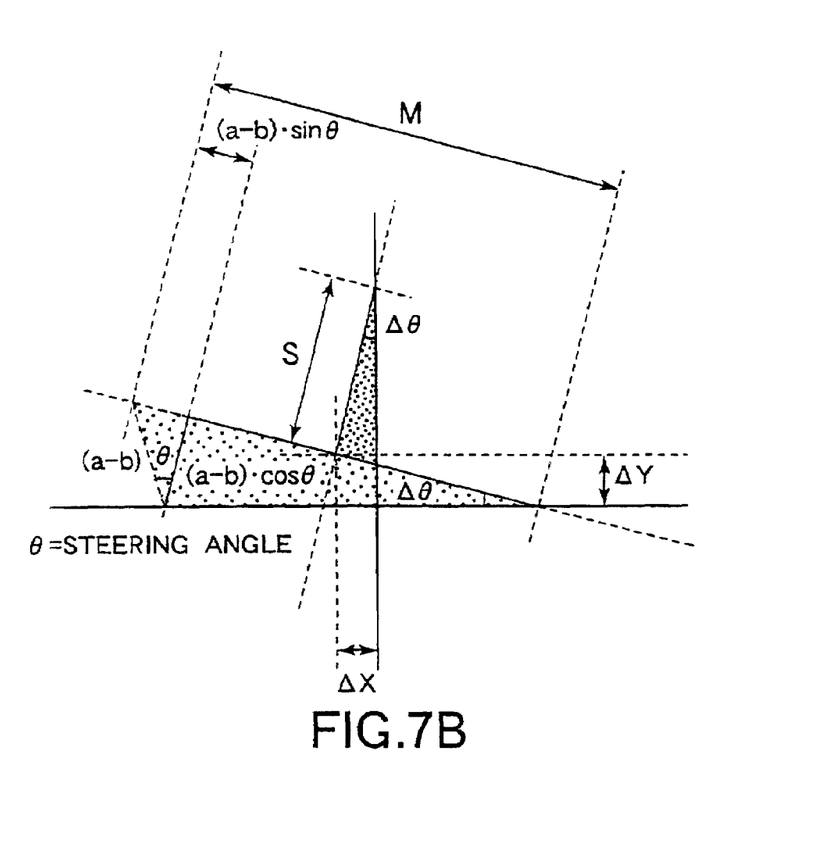
FIG. 7B is a diagram illustrating a specific method for calculating the correction of the angle of the pedestal.

Next, an angle correction calculating method will now be described concretely with reference to FIG. 7B. Let us suppose that the steering angle of the handle 5 is θ, the distance between the two first optical sensors 8a and 8b is M, and the distance between the line connecting the centers of the first optical sensors 8a and 8b, and the second optical sensor 9 is S. First, the pedestal 2 is placed close to the originally set origin. Then, the pedestal 2 is moved such that the first optical sensors 8a and 8b cross the X axis, and the rotation angle Δθ of the pedestal 2 when the first optical sensor 8b crosses the X axis is obtained. FIG. 7A illustrates the just-mentioned status. Here, where the distances which the wheels 7a and 7b have moved until the first optical sensor 8b crosses the X axis are represented by a and b, respectively, Δθ, ΔX and ΔY of FIG. 7B are given by the following formulas, respectively:

$$\Delta\theta = \tan^{-1}((a-b)\cos\theta/(M-(a-b)\sin\theta))$$

$$\Delta Y = (M/2)\sin\Delta\theta$$

$$\Delta X = S\sin\Delta\theta.$$

Since values a and b can be obtained from the counts of the encoders 11a and 11b mounted on the wheels 7a and 7b, the rotation angle Δθ of the pedestal 2 can be obtained from the equation.

After that, the pedestal 2 is moved further only a small distance, so as to obtain new values a and b. From the newly obtained values and b, a new Δθ for the small distance is obtained. If thus newly obtained Δθ value is added to the previously obtained Δθ value, the rotation angle for the small distance moved can be known. Therefore, from the newly obtained values of a, b and Δθ, the position of the pedestal when it is moved by a small distance, can be known. Then, by repeating the above-described operation, the position and rotation angle of the pedestal 2 can be detected at all times.

Figure 8:
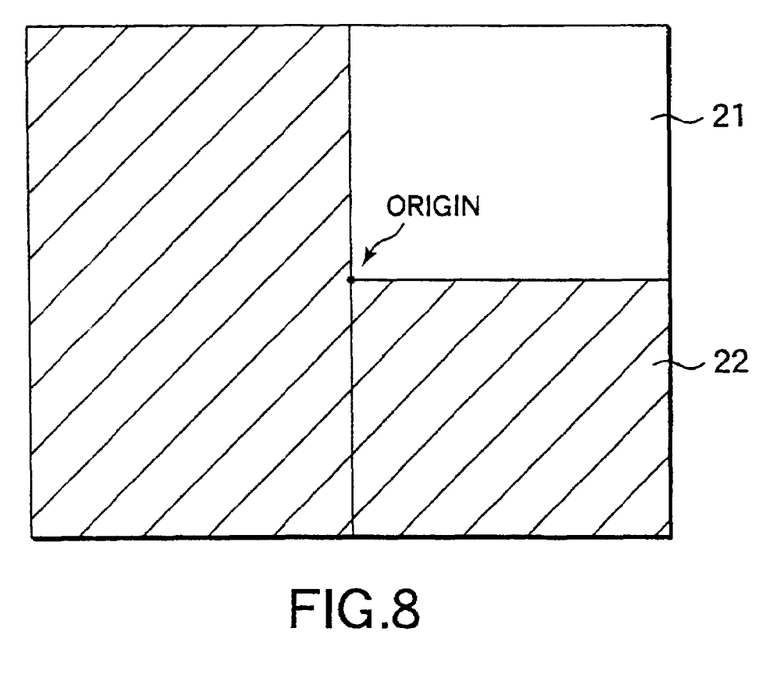
FIG. 8 is a diagram illustrating an example of a preferable reference point passing point.

Further, in order to set the reference position at a high accuracy (correction of origin), it is preferable that a reference position passing point should be formed by combining two kinds of plate members 21 and 22 of different colors (for example, of hard vinyl chloride plate) together as shown in FIG. 8. In this manner, the horizontality and verticality can be guaranteed by the accuracy of the cut surface of the plate members, and therefore the reference position can be set at a high accuracy.

The rotation angle of the pedestal 2 can be calculated from the difference in moving distance between two of the three wheels of the pedestal 2 using the following equation:

$$\Delta\theta = \tan^{-1}\{(a-b)/Na\}$$

where a and b represent moving distances of the two wheels 7a and 7b, respectively, and Na represents the distance between the wheels 7a and 7b.

The above-described results are obtained in connection with the case where a pair of wheels 7a and 7b are focused to calculate out ΔX, ΔY, θΔ; however it is also possible to consider some other cases such as a pair of wheels 7b and 7c, and a pair of wheels 7a and 7c for the calculation as long as the wheels are distant in term of a moving direction.

Figure 9:
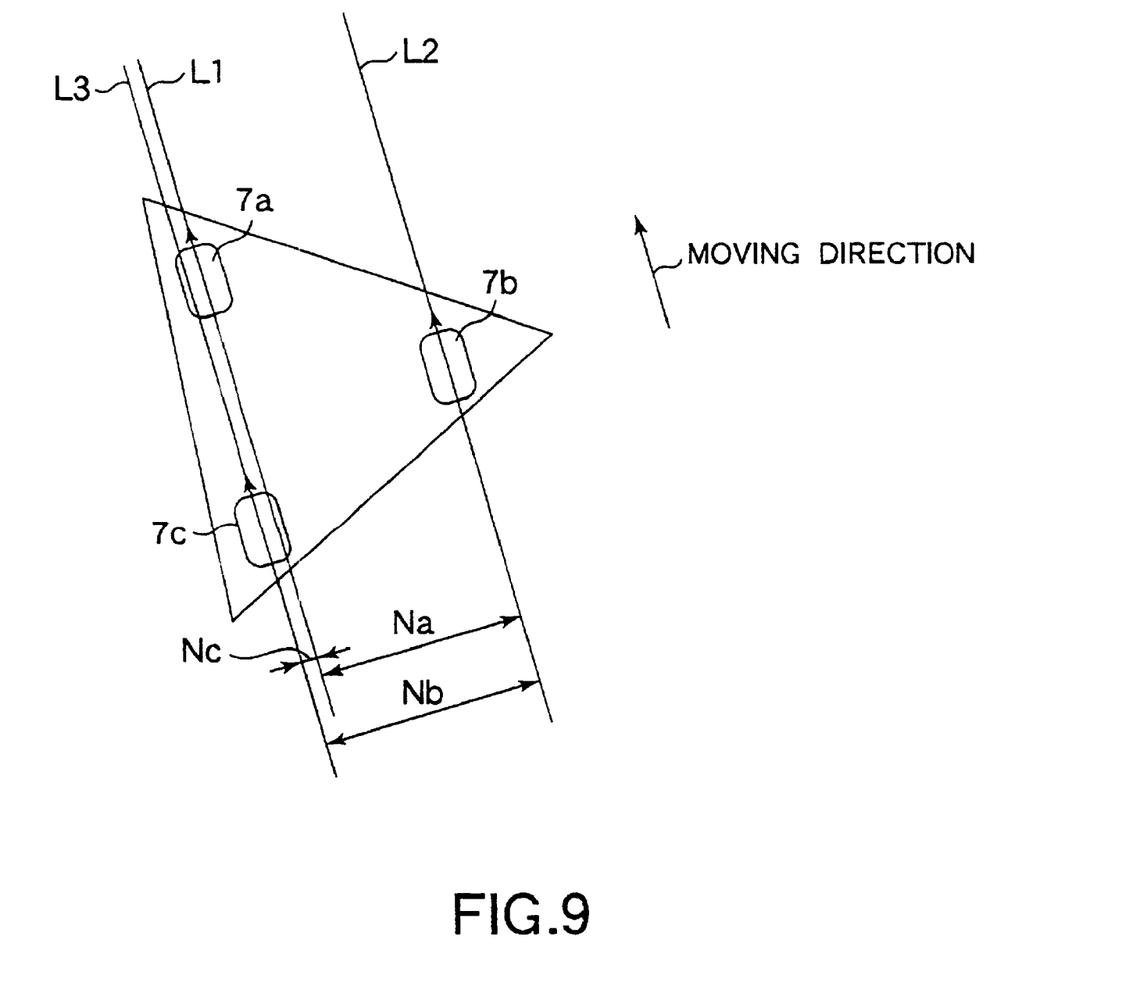
FIG. 9 is a diagram illustrating how to select two wheels used to calculate the rotation angle of the pedestal.

This embodiment is characterized by how to select which two of the three wheels should be selected for the calculation, and a pair of wheels most distant in terms of the moving direction should be selected. More specifically, as shown in FIG. 9, let us draw lines L1, L2 and L3 which pass the center of the three wheels 7a, 7b and 7c, and are parallel to the moving direction. Then, the distance Na between L1 and L2, the distance Nb between L2 and L3, and the distance Nc between L3 and L1 are measured, and such a pair of wheels that have the longest distance should be selected. In the case shown in FIG. 9, the distance Nb is the longest and therefore the wheels 7b and 7c are selected. With this selection, the rotation angle can be calculated at a high accuracy.

It should be noted here that the moving direction is determined by the steering angle of the ring-shaped handle 5 mounted on the pedestal 2, and therefore subject wheels for the calculation may be automatically selected on the basis of the steering angle of the handle 5 by presetting, or the optical wheels may be selected by the computer mounted on the pedestal 2.

The embodiments described above are simply intended to clarify the technical concept of the present invention. Of course, the present invention should not be limited to the embodiments described above in interpreting the technical scope of the present invention. The present invention can be worked in variously modified fashions within the spirit of the present invention and within the scope defined by the accompanying claims. For example, the above-described embodiment is discussed in connection with a case where a real shot image and a virtual image are synthesized together; however the invention is not limited to this embodiment but can be applied to a case where real object images are synthesized together. Further, the synthesis of images can be carried out in real time or later in editing. Naturally, the shape of the pedestal is not limited to the above embodiment. The number of wheels may be more than three. Further, the detection method of the moving amount, and the setting method for the reference position and reference angle, etc. are not limited to the embodiment.

What is claimed is:

1. An image pick-up system for picking up a real object image of an object to be operated together with another image, said system comprising:
a camera unit comprising a camera for picking up an image of an object mounted on a moving pedestal via a pan head;
calculating means for calculating a positional relationship between the camera and the object;
setting means for setting a reference position on a floor surface on which the moving pedestal moves and a reference angle of the moving pedestal and for inputting the reference position and the reference angle to said calculating means; and
detection means for detecting a moving amount of the moving pedestal from the reference position, and a rotation angle of the moving pedestal from the reference angle;

wherein said calculating means calculates a position and an angle of the camera with respect to the object based on the reference position, the reference angle, the moving amount and the rotation angle of the moving pedestal, and the calculating means transmits data of the position and the angle of the camera with respect to the object to a computer for operating together the real object image of the object taken with the camera and said another image based on the position and the angle of the camera with respect to the object;
wherein said detection means detects the moving amount of the moving pedestal by measuring a length of a portion of a wheel of the moving pedestal, which has been brought into contact with the floor surface;
wherein the moving pedestal comprises at least three wheels and said detection means includes at least three encoders each for detecting a moving distance of a respective one of the wheels;
wherein the moving pedestal further comprises a roller in contact with each of the wheels to be rotated together with the wheel; and
wherein the moving distance of each of the wheels is detected based on the number of rotations of the respective roller and a pulse number counted by the respective encoder.

2. The system according to claim 1, wherein said setting means includes a reference detection mechanism for detecting the reference position and the reference angle.

3. The system according to claim 1, wherein the rotation angle is calculated from the moving distance detected by the encoders corresponding to two of the wheels, which are distant with respect to the moving direction.

4. The system according to claim 3, wherein said two wheels are most distant along a direction perpendicular to the moving direction of the wheels of the moving pedestal.

5. The system according to claim 1, wherein a first line and a second line are provided on the floor surface to perpendicularly intersect at said reference position,
wherein two first sensors for detecting the first line and one second sensor for detecting the second line are provided on the moving pedestal, and
wherein said reference position and said reference angle are found based on a position of each of the two first sensors at a time when the two first sensors each pass said first line, and a position of the second sensor at a time when said second sensor passes the second line.

6. An image pick-up system for picking up a real object image of an object to be operated together with another image, said system comprising:
a moving pedestal including three wheels;
a camera unit comprising a camera for picking up the real object image of the object, which is mounted via a pan head on said moving pedestal;
calculating means for calculating a positional relationship between the camera and the object;
three encoders provided respectively corresponding to said three wheels of said moving pedestal;
a plurality of sensors provided on said moving pedestal for detecting a predetermined mark on a floor surface on which said moving pedestal moves;
setting means for setting a reference position on the floor surface and a reference angle of said moving pedestal, which are determined based on detection values of said plurality of sensors and pulse numbers counted by said encoders during movement of said moving pedestal, and for inputting the reference position and the reference angle to said operation means; and detection means for detecting, based on the pulse numbers counted by said encoders, a moving amount of the moving pedestal from the reference position, and a rotation angle of the moving pedestal from the reference angle;

wherein said calculating means calculates a position and an angle of the camera with respect to the object based on the reference position, the reference angle, the moving amount from the reference position and the rotation angle from the reference angle, which are obtained based on the pulse numbers counted by said encoders, and transmits data of the position and the angle of the camera with respect to the object to a computer for operating together the real object image of the object taken with the camera and said another image based on the position and the angle of the camera with respect to the object;

wherein said detection means detects the moving amount of the moving pedestal by measuring a length of a portion of a wheel of the moving pedestal, which has been brought into contact with the floor surface;

wherein the moving pedestal further comprises a roller in contact with each of the wheels to be rotated together with the wheel; and wherein the moving distance of each of the wheels is detected based on the number of rotations of the respective roller and a pulse number counted by the respective encoder.

7. An image pick-up system for picking up an image of an object, said system comprising:

a camera unit comprising a camera for picking up an image of an object mounted on a moving pedestal via a pan head;

calculating means for calculating a positional relationship between the camera and the object;

setting means for setting a reference position on a floor surface on which the moving pedestal moves and a reference angle of the moving pedestal and for inputting the reference position and the reference angle to said calculating means; and detection means for detecting a moving amount of the moving pedestal from the reference position, and a rotation angle of the moving pedestal from the reference angle;

wherein said calculating means calculates a position and an angle of the camera with respect to the object based on the reference position, the reference angle, the moving amount and the rotation angle of the moving pedestal, and the calculating means transmits data of the position and the angle of the camera with respect to the object to a computer for creating an image containing a real object image of the object taken with the camera;

wherein the moving pedestal comprises at least three wheels and said detection means includes at least three encoders each for detecting a moving distance of a respective one of the wheels;

wherein the moving pedestal further comprises a roller in contact with each of the wheels to be rotated together with the wheel; and wherein the moving distance of each of the wheels is detected based on the number of rotations of the respective roller and a pulse number counted by the respective encoder.

* * * * *